United States Patent Office 3,322,868
Patented May 30, 1967

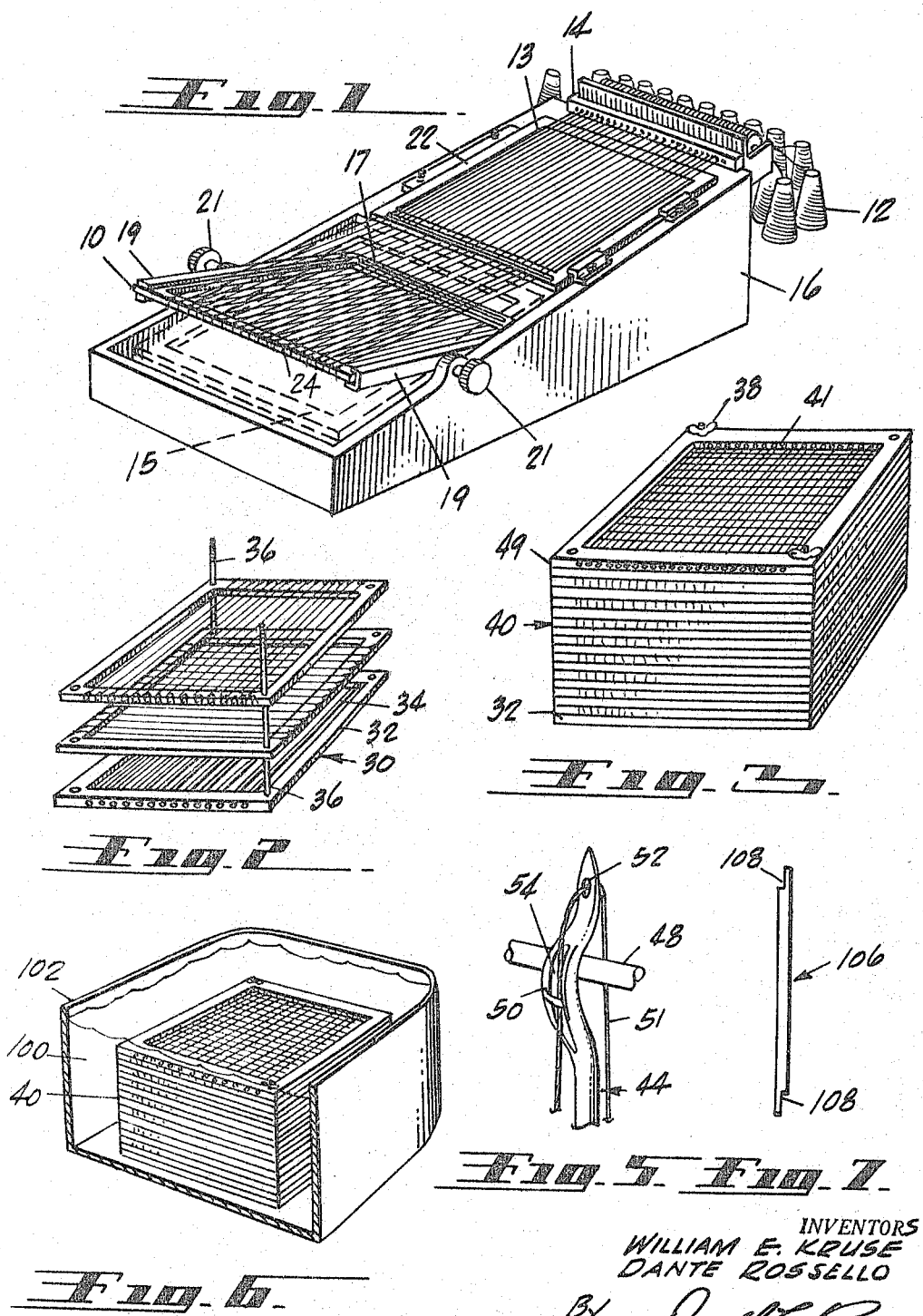

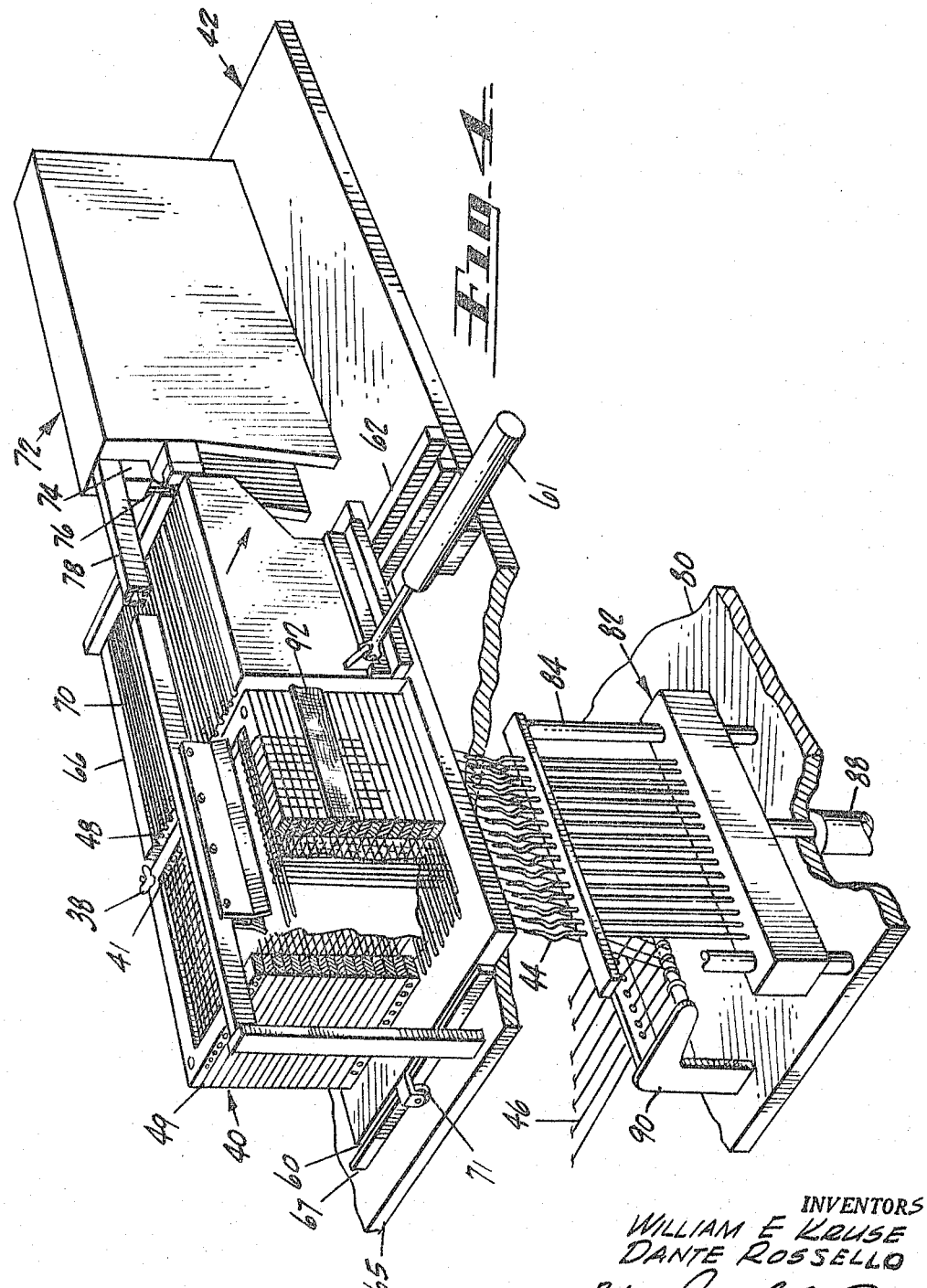

3,322,868
THREE DIMENSIONAL REINFORCED
STRUCTURE
William E. Kruse, Culver City, and Dante Rossello, Long
Beach, Calif., assignors to Douglas Aircraft Company,
Inc., Santa Monica, Calif.
Filed July 2, 1963, Ser. No. 294,788
6 Claims. (Cl. 264—45)

This invention relates to panels, blocks, and similar structural elements reinforced by means of the incorporation of fibers arranged in an orderly pattern, and further relates to methods for manufacturing such elements.

There are many applications where it is desirable to use a panel having the properties of already available panel materials except that it must have greater strength. For example, an extremely good insulator of low weight and high strength is needed in rocket tanks used to hold cryogenic liquids. Such insulation in rocket tanks used to hold cryogenic liquids. Such insulation is subjected to very high stresses when cryogenic fluids are poured into the tank because of the sudden and great lowering of temperature which causes contraction of the materials of the tank and attached fittings. Blocks of foam material such as polyurethane or polystyrene have been used as insulators in such applications, but although such materials are excellent insulators and very light in weight, they do not possess the strength necessary to prevent cracking and other structural failures when subjected to large temperature changes. This invention enables the manufacture of a very strong, light-weight insulation material by providing a reinforcing structure for use in connection with a matrix of weak insulation material. The invention also provides a means for producing various types of reinforcing structures that are needed to achieve the proper strengthening of otherwise desirable materials.

It is known that foam panels can be strengthened by incorporating taut fibers attached to opposite faces of the panel. Such means increase the strength of the foam in one direction, but do not provide for strengthening in other directions in which stresses are likely to be encountered. In those applications such as insulation blocks for cryogenic tanks, where foam is a very desirable material, drastic cooling occurs which results in stresses in three directions. A foam material strengthened in only one direction but subjected to cooling stresses extending in three directions, may crack and would therefore not be satisfactory. This invention provides a means for strengthening foam in three directions by providing a structure composed of three groups of mutually perpendicular threads so arranged that it may be easily produced. Furthermore this invention provides a relatively economical production method which enables the manufacture of a structure of uniformly high quality.

Accordingly, one object of the invention is to provide a multi-directional reinforcing network of fibers or strands adaptable for incorporation in a matrix.

Another object of the present invention is to provide a multi-directional reinforcing structure which is adaptable for the uniform production thereof.

A further object of the present invention is to provide a foam insulation material incorporating a network of strands or fibers arranged in an orderly multi-directional network.

A further object of the present invention is to provide a method for enabling the economical production of a uniform multi-directional network of fibers or strands.

A further object of the present invention is to provide insulating blocks incorporating a three-dimensional network of reinforcing fibers which are adaptable for the secure fastening or bonding to a tank or other structural member.

A further object of the present invention is to provide insulating panels which may be joined to form a continuous insulating covering having joints that provide a minimum heat conduction path through the panel covering.

These and other objects and a more complete understanding of the present invention may be had by reference to the following description and claims taken in conjunction with the accompanying drawings in which:

FIGURE 1 is a pictorial view showing the winding of fibers on a frame to obtain two rows of reinforcing fibers.

FIG. 2 is a pictorial view showing the method of stacking frames to obtain a two-dimensional system of reinforcing fibers.

FIG. 3 is a pictorial view showing a stack of frames assembled as shown in FIG. 2.

FIG. 4 is a pictorial view showing a method for passing a third-dimensional group of fibers through the frame of FIG. 3 to obtain a three dimensional network of fibers.

FIG. 5 is a pictorial sectional view showing the method of immersion of a frame containing a three-dimensional network of fibers in a bath of foaming matrix material.

FIG. 6 is a pictorial sectional view showing a stack of frames in a container.

FIG. 7 is a side elevational view of an insulating panel which is cut from a three-dimensionally reinforced block of insulating material produced by the method of the invention.

The method of the invention allows for the production of reinforced foam or similar material by providing a three-dimensional network of fibers. Such a network is produced by first weaving a one-dimensional pattern of fibers or strands on each of many frames, stacking the frames so that the orientation of the strands on adjacent frames is perpendicular, and then threading strands through the stack of frames so as to produce a network in which the strands extend in each of three mutually perpendicular directions. The resulting three-dimensional network is then immersed in a bath of matrix material such as polyurethane foam, before the material has foamed, cured or otherwise hardened. After the matrix material hardens the frames are removed and there is obtained a block of structural material reinforced by a three-dimensional lattice of fibers. Such a block can be cut into panels or otherwise shaped as desired.

The first step in the manufacture of a system of fibers in accordance with the invention is to wind lengths of the fiber around a frame. There are several ways of accomplishing this, including placing a frame on a lathe and continuously winding a strand of fiber around the frame until a pattern of almost parallel lines stretching across the frame has been obtained. A simpler and speedier method shown in FIG. 1 utilizes numerous spools of thread material. Spools 12 of thread 13 of a material such as glass fibers are held on axles which allow them to rotate freely. Each strand is positioned in a path which extends through a tensioning device 14 and to the bottom of a jig 16. The jig is sloped to enable the easier carrying out of the processes of winding the frames. A lower frame 10 in the jig 16 is held by two brackets 19. The brackets are rotatably mounted on the jig, and are provided with handles 21 to enable the turning of the brackets 19 and frame 10.

A frame is wound in a manner shown in FIG. 1 by first taping the ends of the threads 13 to the bottom edge or side 15 of the upward face of the frame 10 as it lies in the jig. The frame 10 is then turned by rotating the handles 21 by 180° in a direction which lifts the top of the upward face and rotates it so that it becomes the bottom of the downward directed face. Then the fibers are taped to the top 17 of the upward face as it appears after rotation, and the strands are also taped to the bottom of the second frame 22 to prepare it for winding. Finally the fibers are severed along a line running between the first frame 10 and second frame 22. The first frame 10 is then removed from the jig and the second frame 22 is slid downward into the brackets 19, while a third frame is placed in the position previously occupied by the second frame 22. The winding of the second frame 22 then proceeds in a manner described hereinabove for the first frame 10.

In order to assure that the threads will be located in a predetermined position, notches 24 are provided at the edges of each frame. The strands fall into these notches, thereby assuring that both sides of the winding are precisely aligned.

The second step in the method of creating a three-dimensional fiber network is to place the frames on a holding fixture 30. The holding fixture 30 comprises an unwound bottom frame 32 similar to the wound frames described hereinabove, except that it includes a plurality of coplanar rods 34 extending in one direction across the frame, the spacing of the rods being exactly the same as the spacing between adjacent turns of thread on each frame. Two fixture bars 36 project from opposite corners of the frame 32. These bars 36 are used for aligning the wound frames and holding them together.

In order to obtain a stack of frames, each wound frame is placed over the bars 36. Fiber reinforcement in two directions is obtained by placing the frames on the holding fixture 30 so that the fiber directions of adjacent frames are perpendicular. Thus, if the frame immediately above the bottom frame 32 is oriented so that its fibers extend parallel to the rods 34, the next frame placed above it is oriented so that the fibers extend in a direction perpendicular to the rods 34. After sufficient frames are placed on the fixture 32 to obtain a stack 40 of the desired height, an unwound top frame 49 is placed on the rods 38 at an end of the stack opposite the frame 32. The top frame 49 is similar to the bottom frame 32 and is adapted to receive bars extending parallel to the rods 34. Finally, nuts 38 are screwed onto the top of the rods 36 to hold the stack 40 together. The stack of frames is now ready to be threaded by fibers which extend in an up and down or third direction.

Fibers are placed in a third direction through the stack of frames by the use of a threading machine 42 in a manner shown in FIG. 4. The machine 42 comprises a supported bed 65 on which is mounted two rails 62 and a guide 67. A platform 60 mounted on the rail 62 and a roller assembly 71 which abuts the guide 67 is thereby restricted to linear movement. The stack of frames 40 which is to be threaded in a third direction by the machine 42 is mounted on the platform 60 of the machine. Mounted on the platform adjacent the stack is a rod holder 66 which comprises numerous slots 70 within which lie anchor rods 48. The rods 48 are adapted for insertion into the upper frame 49 of the stack 40, and each slot is aligned with a rod receiving hole 41 in the upper frame 49. The platform 60 is attached to a hydraulic cylinder 61 which moves the platform and the stack and rod holder thereon.

A rod inserting mechanism 72 for inserting the anchor rods 48 into the receiving holes 41, is mounted on the bed 65 adjacent the rod holder 66. The inserting mechanism comprises a ram 74 movable along a rail 78. The ram carries a finger 76 adapted for movement within the slot 70 to push the anchor rods 48 into the receiving holes 41. After each stroke of the ram, the finger 76 is withdrawn from engagement in a slot to enable the advancement of the holder 66.

A shelf 80 below the bed 65 carries needle threading machinery including a needle holder 82 on which is mounted a multiplicity of needles 44 arranged in a line. The needle holder 82 comprises two guide rods 84 which are slidably mounted in holes in the shelf 80. A vertical ram 88 is attached to the needle holder 82 and serves to move it in linear vertical strokes. Each needle 44 carries threads 46 which extend from spools through a tensioning mechanism 90, through the needles, and over the side of the stack 40 to which they are fastened by a tape strip 92.

In the operation of the machine 42, the needle holder 82 is pushed upward thereby causing the needles 44 to push or insert portions of thread 46, which are thereby formed as narrow loops, completely through the two-dimensional system of reinforced fibers held by the stack of frames 40. When the needle holder 82 reaches the top of the inserting stroke, an anchor rod 48 is pushed through a hole 41 in the top frame 49 of the stack, and passes between the two thread portions of the narrow loop inserted by the needle 44 as shown in FIG. 5.

Each needle 44 is a long straight rod having an end with an abruptly curved lateral deformation 50. An aperture 52 spaced from the deformation, and a guide hole 54 extending through the convex side of the deformation are adapted to receive and hold a thread. When a thread is pulled or tensioned toward the base or shank of the needle, which is opposite the deformation 50, a space is created between a thread portion 51 and the deformation 50, within which an anchor rod 48 can pass.

After a rod 48 has been inserted through the line of needles 44, the needles are pulled downwardly to withdraw them from the stack 40. The needles are long and flexible enough that the rounded ends deflect and pass over the rods 48. After complete withdrawal, the ram 61 shifts the platform 60 a distance equal to the spacing of the rods 34 and holes 41. The needles 44 are thereupon reinserted through the stack of frames 40. Of course, it is possible to shift the needles instead of the stack, so the shifting is just relative.

Each insertion of each needle 44 results in the placement of two tension strands in the third reinforcing direction. The process of inserting the needles, withdrawing them and advancing the platform 60 is continued until the entire stack is threaded. Then the thread portions leading to the needle 44 are taped to the sides of the stack 40 and severed. A three-dimensional network of reinforcing threads has now been obtained, comprising multiple layers or sets of parallel threads, each set perpendicular to adjacent sets in the stack, and including threads extending perpendicular to and protruding between the threads of each set.

It should be noted that the threads are not interlaced or interwoven, but are straight or linearly extending. Such a pattern is believed as strong or stronger than an interlaced structure because the threads are straight and do not yield or become longer under stresses as do threads which include multiple bends of the type resulting from interweaving. Additionally, such a structure is more easily produced than an interwoven structure and a more uniform product is obtained.

In order to construct insulating blocks using the reinforcing network produced in the manner described hereinabove a pool of foaming material 100 is poured into a container 102, and before the materials begin to foam the stack of frames 40 is dropped into the container 102. The foaming material 100, which covers the network of threads, fills the spaces between the threads and produces a foam throughout the network. After the foam has become hardened the contents of the container are removed and the frames which had supported the fiber network are detached.

The detachment of the frames may be accomplished in any one of a number of ways. In most of these methods the top and bottom frames are first removed by cutting or pulling them away, or the rods 34 and 48 are removed from the top and bottom frames. In one method a hole is thereafter drilled through the block at a point immediately within one of the corners of the stack. The blade of a bandsaw is then inserted through this hole and a rectangular block of the material cut away from the frames by guiding the bandsaw blade along each of the four inner sides of the frames. Another method is to remove each of the frames by pounding them away with a hammer, crowbar, or similar instrument. The resulting block may then be cut up to obtain panels which are useful in insulating cryogenic tanks or in other similar applications.

One form of panel cut from a block is shown in FIG. 7. Each of the four edges 108 of the panel 106 are stepped or indented. Panels are normally joined together by glueing them at their edges. By making the edges stepped, the glue path is longer and this provides a longer heat path to reduce the conduction of heat between opposite faces of the panels.

The panels constructed in the manner described hereinbefore are useful as insulation in cryogenic tanks and the like. In such applications, maximum stresses in the insulation are likely to result from a sudden contraction of the inner tank and inner insulation as the tank is filled, wherein the inner face of the panel tends to pull away from the outer face. For this reason, greater thread reinforcing is needed in a direction normal to the face of the panels. Accordingly, the threads placed in the third direction, as by the method shown in FIG. 4, may be of larger size than the threads in the other two perpendicular directions. When the blocks woven in the described manner are cut to form panels, they are cut so that the large threads extend between the panel faces.

Although a particular embodiment of the process and product thereof have been shown, obviously many modifications and alterations may be made in the steps of the process and particular choice and arrangement of the parts of the product. It is therefore desired to emphasize the fact that many further modifications may be resorted to in a manner limited only by a just interpretation of the following claims.

We claim:

1. A method for obtaining a structure useful in insulation applications comprising:
    establishing and maintaining several sets of threads, each set including a multiplicity of substantially coplanar, uniformly spaced, parallel threads,
    making a stack of said sets whereby adjacent sets in said stack are prependicular,
    forming and repeatedly inserting narrow loops of a third thread into a first end of said stack at points on said first end spaced a distance equal to the spacing of said threads in at least one of said sets;
    projecting each of said narrow loops through said stack and catching and holding them near the end of said stack opposite said first end, whereby to obtain a uniform arrangement of threads extending in substantially perpendicular directions,
    immersing said uniform arrangement of threads in a bath of foamable, solidifiable insulation material and allowing said insulation material to harden; removing said arrangement from said bath; and
    cutting said insulation material into panels wherein faces of said panels are substantially perpendicular to one of said groups of threads and substantially parallel to said other two groups.

2. A method for obtaining a structure useful in insulation applications comprising:
    establishing and maintaining several sets of threads, each set including a multiplicity of substantially coplanar, uniformly spaced parallel threads;
    making a stack of said sets whereby adjacent sets in said stack are perpendicular;
    establishing a multiplicity of substantially parallel, coplanar first bars at a first end of said stack, said bars substantially parallel to the threads in at least one of said sets and said bars uniformly spaced a distance apart equal to the spacing of the threads on said at least one of said sets, whereby said stack may be easily woven to obtain a structure with threads extending in three substantially perpendicular directions;
    repeatedly inserting a multiplicity of threaded needles arranged in a row into said first end of said stack and projecting them through said stack in a direction perpendicular to said first bars;
    repeatedly inserting holding bars into the end of said stack opposite said first end, each of said holding bars inserted through multiple loops of thread formed by said multiplicity of threaded needles when said multiplicity of needles is projected through said stack;
    repeatedly withdrawing said multiplicity of needles from said stack and advancing it in a direction perpendicular to said coplanar bars at said first end of said stack, after each holding bar is inserted into said stack, whereby to obtain a structure having groups of threads extending in substantially three perpendicular directions.

3. The method according to claim 1 and wherein said third threads are larger in cross section than said sets of threads and said cutting of said insulation is performed so that said third threads are substantially normal to the face of said panels.

4. The method according to claim 2 and further including:
    establishing a bath of foamable, solidifiable insulation material;
    immersing said stack in said bath;
    allowing said insulation material to harden;
    removing said first bars and said holding bars after said insulation material has hardened; and cutting said insulation material into panels wherein the faces of said panels are substantially normal to one of said groups of threads.

5. The method according to claim 2 wherein:
    each of said needles includes an abrupt, curved, lateral deformation forming a hollow near its inserting end; and
    said holding bars are inserted at least partially in the hollow formed by said lateral deformation, whereby to enable said holding bars to catch the loops formed by said needles.

6. A method for producing a reinforced insulator comprising:
    establishing several sets of coplanar, uniformly spaced, parallel threads and fastening said sets to frames;
    stacking said frames whereby at least several adjacent sets of threads are perpendicular;
    applying first holding means for maintaining the threads of said stack of sets in said parallel stacked arrangement;
    establishing a multiplicity of parallel, coplanar bars at one end of said stack, said bars parallel to the threads in at least one of said sets and said bars uniformly spaced a distance apart equal to the spacing of the threads on said at least one of said sets;
    positioning a rod receiving frame at an end of said stack opposite the end at which is maintained said multiplicity of bars;
    mounting a plurality of bars in a fixture adjacent said rod receiving frame;
    inserting a multiplicity of needles through said stack in a direction perpendicular to the extension of said threads in said stack, each needle carrying a loop of thread;
    ramming individual holding rods into said bar receiving frame of said stack while said needles are inserted through said stack, said holding rods inserted between the threads of individual loops;
    withdrawing said needles from said stack;
    advancing said needles relative to said bed and reinserting them through said stack.

(References on following page)

References Cited

UNITED STATES PATENTS

| | | | |
|---|---|---|---|
| 1,243,368 | 10/1917 | Willard | 264—258 X |
| 2,037,893 | 4/1936 | Greeman | 18—58.5 |
| 2,083,199 | 6/1937 | McBurney et al. | 161—50 |
| 2,094,334 | 9/1937 | Weaver et al. | 161—50 |
| 2,106,674 | 1/1938 | Busch | 87—7 |
| 2,135,057 | 11/1938 | Slayter et al. | 161—60 X |
| 2,275,227 | 3/1942 | Kaminow | 87—5 |
| 2,495,808 | 1/1950 | Colmant | 161—57 X |
| 2,757,701 | 8/1956 | Henson. | |
| 2,762,739 | 9/1956 | Weiss | 156—79 X |
| 2,879,197 | 3/1959 | Muskat et al. | |
| 2,941,257 | 6/1960 | Davis | 18—58.5 |
| 3,002,476 | 10/1961 | Capelli | 112—224 |
| 3,016,068 | 1/1962 | Felix | 139—11 |
| 3,042,548 | 7/1962 | Aikens | 117—113 |
| 3,056,430 | 10/1962 | McGinley | 139—11 |
| 3,060,876 | 10/1962 | Surbeck | 112—224 |
| 3,072,498 | 1/1963 | Knowles | 117—113 |

SAMUEL W. ENGLE, *Primary Examiner.*

CARL D. QUARFORTH, BENJAMIN A. BORCHELT,
*Examiners.*

W. T. HOUGH, R. V. LOTTMANN,
*Assistant Examiners.*

UNITED STATES PATENT OFFICE
CERTIFICATE OF CORRECTION

Patent No. 3,322,868                          May 30, 1967

William E. Kruse et al.

It is hereby certified that error appears in the above numbered patent requiring correction and that the said Letters Patent should read as corrected below.

Column 1, line 13, after "elements." insert -- The invention described herein was made in the performance of work under a NASA Contract and is subject to the provisions of the National Aeronautics and Space Act of 1958, Public Law 85-568 (72 Stat. 426; 42 U.S.C. 2451), as amended. --.

Signed and sealed this 26th day of November 1968.

(SEAL)
Attest:

Edward M. Fletcher, Jr.

Attesting Officer

EDWARD J. BRENNER

Commissioner of Patents